Patented May 13, 1947

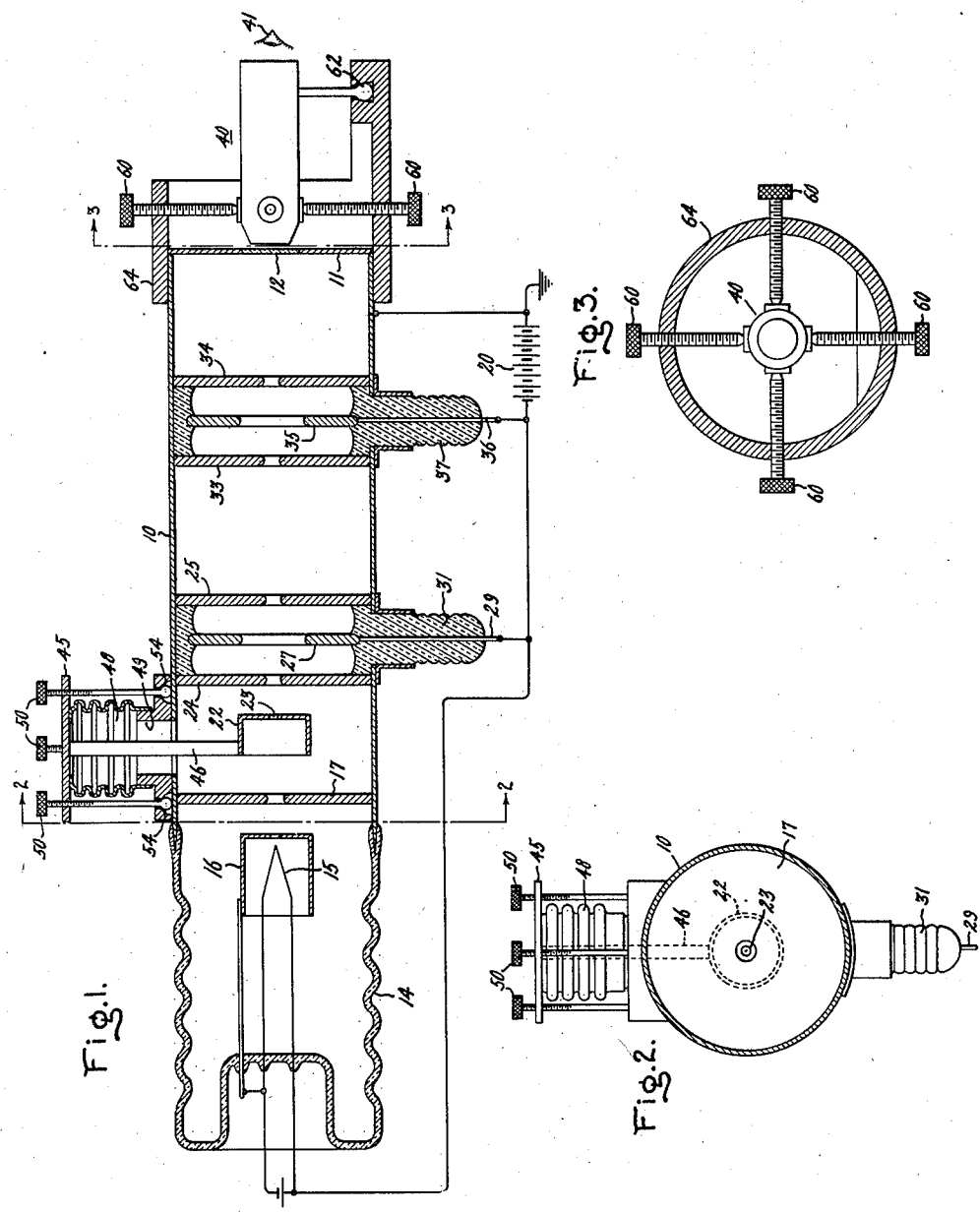

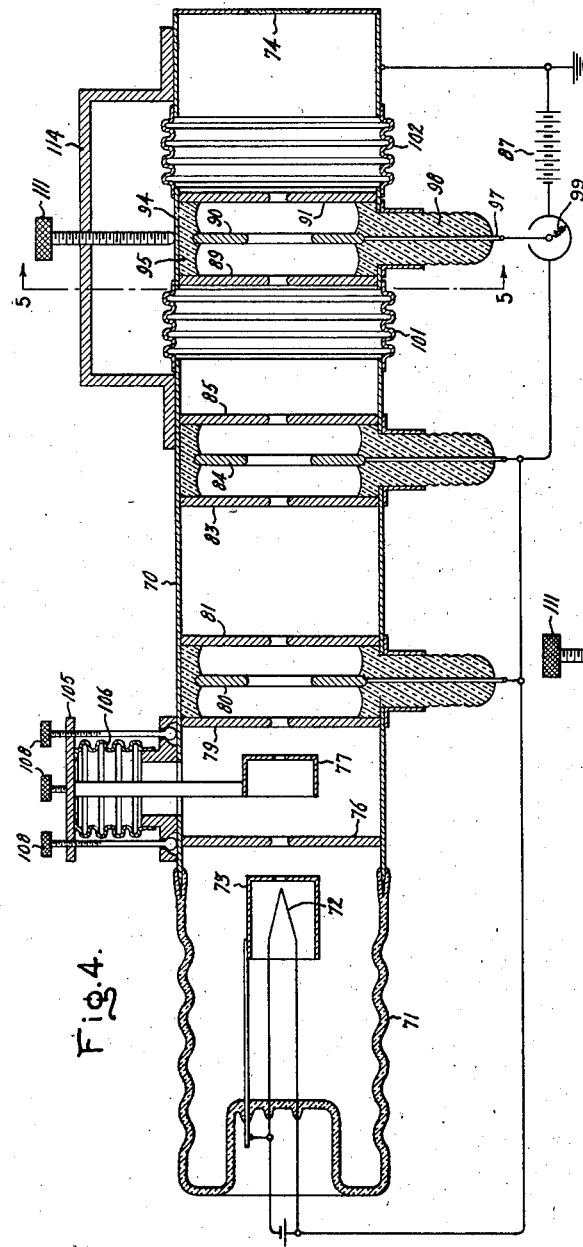

2,420,560

UNITED STATES PATENT OFFICE 2,420,560

ELECTRON MICROSCOPE

Simon Ramo, Schenectady, N. Y., assignor to General Electric Company, a corporation of New York Application May 30, 1942, Serial No. 445,248

2 Claims. (Cl. 250—49.5)

1

The present invention relates to improvements in electron microscopes.

The electron microscope achieves magnification effects by utilizing the power of electric and magnetic fields to refract the component rays of an electron stream in a manner analogous to the refraction of light by the lenses of an optical microscope. The electron microscope possesses an inherent advantage over the light microscope, however, in that its theoretical resolving power and, consequently, the useful magnification which it can produce are materially greater. In some instances, magnifications on the order of 100,000 diameters have been obtained by electron microscopy.

In the electron microscope, as in the light microscope, it is necessary to provide means for accurately positioning the specimen desired to be examined with respect to the operative elements of the microscope. Because of the tremendous magnification involved it becomes difficult to devise a specimen manipulator which is sufficiently fine in its action. With any but a very costly arrangement there is a likelihood that even the most careful movement of the manipulating means will cause the specimen to move abruptly across the entire useful lens field. This difficulty can be overcome by the use of elaborate micrometer arrangements but such devices are open to the objection that their cost of fabrication is extremely high.

It is an object of the present invention to provide in connection with an electron microscope a manipulating arrangement which achieves the effect of a very fine micrometer adjustment while actually making use of relatively coarse adjusting means. This is accomplished in a particular embodiment of the invention by dividing the adjusting means into two parts, one part being associated with the specimen holder and the other with one of the last stages of the magnifying system. For example, in a specific case, use is made of a relatively coarse specimen manipulator which is just fine enough to make it possible to locate the specimen in the effective object field of the first lens stage of the microscope, while a second manipulator, also relatively coarse in operation, is provided to bring some desired part of the partially magnified image of the specimen into the effective object field of the last magnifying agency. The considerations which make this arrangement feasible and from which advantages arise, will be explained more fully at a later point.

The features of the invention which are de-

2 sired to be protected herein, are pointed out with particularity in the appended claims. The invention itself, together with further objects and advantages thereof, may best be understood by reference to the following description taken in connection with the drawing in which Fig. 1 is a sectional view of a magnifying apparatus suitably embodying the invention; Figs. 2 and 3 are cross-sections on lines 2—2 and 3—3 respectively of Fig. 1; Fig. 4 is a sectional view of a modification of the invention, and Fig. 5 is a cross-section on line 5—5 of Fig. 4.

Referring particularly to Fig. 1 there is shown an electron microscope comprising an elongated vacuum-tight container which consists mainly of a cylindrical metal part 10. At one end the container is closed by a transverse wall 11 which is provided with a glass window 12 at its central area. The window 12 is provided on its inner surface with a material which is adapted to fluoresce under the impact of electrons and which thus serves as an image-reproducing means.

At the end of the microscope remote from the window 12 there is provided a glass insulating structure 14 which serves to support an electron source in the form of a filamentary cathode 15. The cathode is surrounded by an apertured cup-shaped member 16 which confines the emitted electrons to a narrow beam and which is cooperatively positioned with respect to an apertured diaphragm 17 supported in contact with the main envelope part 10. In the normal use of the apparatus the envelope 10 and the electrode 17 are maintained at ground potential, while the cathode is held at several thousand volts below ground (e. g. by connection to a potential source 20) so that electrons emitted from the cathode are projected toward the window 12.

In using the apparatus as an electron microscope it is desired to cause the electron stream proceeding from the cathode 15 to produce in the plane of the screen 12 an enlarged electron optical image of a minute object to be investigated. To this end there is provided in the path of the electron stream a specimen support which is in the form of a cup-shaped member 22 and which has a central aperture 23 over which an object mount (not shown) may be placed. The object to be investigated is introduced into the microscope through a suitable port (not shown) and after closing the port, the microscope is evacuated by connection to a pumping system.

Between the specimen support 22 and the selected imaging plane (the screen 12) there are provided a plurality of electron lens systems for exerting a refractive force on the electron rays proceeding from the specimen under investigation. The first of these comprises a pair of apertured metal diaphragms 24 and 25 which are maintained at ground potential by connection to the envelope part 10 and an intermediate diaphragm 27 which is insulated from the envelope and connected to cathode potential by means of a lead-in conductor 29 which extends through an insulating bushing 31. The second lens system comprises outer electrodes 33 and 34 and an inner electrode 35, the latter electrode being provided with a lead-in conductor 36 which extends through a bushing 37 and connects to the negative terminal of the potential source 20. By the action of the lens system referred to, a relatively minute object positioned at 23 produces on the fluorescent screen 12 a visible image of appreciable magnitude.

With two stages of electron-optical magnification (as in the arrangement illustrated), a magnification on the order of 500 diameters may be readily obtained. However, in order to realize fully the advantages of the electron microscope it is desirable to obtain still further magnification and to this end one or more additional magnifying stages are employed. In the arrangement of Fig. 1 the desired additional magnification is obtained by the use of an optical microscope 40 which has its objective located in proximity to the window 12 so as to produce direct optical magnification of the image produced on the fluorescent screen 12. With this arrangement the 500 diameter image appearing on the screen may readily be magnified from 20 to 100 times by the optical microscope 40 so that a final image having a total magnification of 10,000 diameters or greater may be seen by an observer at the point 41.

As a part of my present invention means are provided for manipulating the specimen support 22 with just sufficient fineness to assure that any desired part of the specimen can be caused to appear somewhere within the region of good resolution of the image produced on the screen 12. (In another manner of statement this implies that the specimen must be capable of being located within the effective object field of the first lens system.) In a practical case, the region of good resolution of the screen image may have a diameter on the order of ten mils and, assuming a magnification of 500 diameters, this means that the specimen manipulator need only be capable of controlled motion which is smooth within limits of about .02 mil. This is a degree of fineness which can be readily achieved by use of a relatively simple form of mechanical movement.

One suitable arrangement is illustrated in Fig. 1 and comprises a movable plate 45 from which the specimen support 22 is mounted through a rigid member 46. A bellows 48, which connects at one end to the plate 45 and at the other end to a sleeve 49 extending outwardly from the wall of the enclosure 10, makes it possible for the plate 45 to be moved without destroying the vacuum tightness of the microscope enclosure. For the purpose of controlling the movement of the plate 45 and the object mount, there are provided a series of four thumb screws 50 which are arranged symmetrically around the plate and which have a screw-threaded engagement with it.

The object support can be raised or lowered from the position which it occupies in Fig. 1 by turning the various thumb screws 50 in the appropriate direction. Motion of the object support in the other plane, that is, perpendicular to the plane of the drawing can be produced by differential rotation of the appropriate thumb screws to produce a tilting of the plate 45. To permit such tilting motion to occur the various thumb screws are provided at their lower extremities with an articulated connection with the microscope enclosure, such connection being in the form of a ball and socket arrangement as indicated at 54. The construction thus provided is mechanically simple and of low cost.

A secondary adjustment which permits the fully magnified image seen by the observer at 41 to include the precise part of the specimen desired to be studied comprises an additional thumb screw manipulator provided in connection with the microscope 40. This includes a series of four thumb screws 60 arranged symmetrically about the objective end of the microscope and adapted to produce motion of the objective in any transverse direction. Such motion of the microscope objective is made possible by supporting the eyepiece end of the microscope in a universal joint as indicated at 62. The microscope 40 and the mechanical adjustment including the screw 60 are supported from the cylinder 10 by means of an appropriate extension 64 projecting from the end of the cylinder.

All that is required of the mechanical movement provided by the thumb screw 60 is that it be capable of training the objective of the microscope 40 upon various areas of the region of good resolution of the screen 12 in sufficiently small increments to permit the entire surface of the said region to be scanned. For this purpose a fineness of controlled motion of the order of one-tenth of a mil will be adequate, which means that the micrometer motion involved need not be of especially fine character.

The overall result of the composite arrangement described in the foregoing is that the effect of smooth motion of the specimen from one or two tenths of a micro-inch to ten micro-inches can be obtained by the use of two mechanical movements, neither of which need actually be capable of motion finer than .02 mil, a task many-fold easier.

The principles of the invention are also applicable in an arrangement in which all stages of magnification are obtained by electron optical means. This is illustrated, for example, in the construction of Fig. 4 which shows an electron microscope having an elongated metallic container 70 terminating at one end in a glass insulator 71. A cathode 72 and a focusing electrode 73 are provided within the insulator 71, and a fluorescent screen 74 (or alternatively a photographic film support) is arranged at the opposite end of the envelope. An accelerating electrode 75 serves to direct electrons from the cathode 72 upon an apertured specimen support 77.

For the purpose of magnifying a specimen supported by the part 77 a number of electron lens systems are provided between the object support and the screen 74. The first two of these are fixed systems and include electrode combinations 79, 80, 81 and 83, 84, 85 respectively, the elements of these combinations being maintained at appropriate potentials by means of a voltage source 87.

The third and final electron lens includes a series of electrodes 89, 90 and 91 which are supported from a metallic collar 94, the electrodes 89, 91 being electrically connected to this collar and the electrode 90 being insulated from it by a body of insulating material 95. A lead-in conductor 97 for the electrode 99 is provided in conjunction with an insulating bushing 98 which is secured to the collar. A shielded flexible connection between the conductor 97 and the voltage source 87 is indicated at 99. The collar 94 and all the parts mounted on it are capable of being moved transversely with respect to the axis of the microscope envelope 70 by virtue of deformable metal rings or bellows 101 and 102 extending between the edges of the collar and adjacent parts of the microscope enclosure.

As in the arrangement of Fig. 1 controlled transverse motion of the specimen support 77 may be obtained by means of a tiltable plate 105 having a bellows connection 106 with the envelope part 70, the motion of the plate being controlled by a series of thumb screws 108. By means of this adjustment a desired portion of the specimen may be brought within the effective object field of the first electron optical lens (i. e. the lens comprising electrodes 79, 80, 81).

In order to permit all the elements of the specimen to be surveyed and to be brought successively into focus on the screen 74, a further mechanical adjustment is provided in connection with the lens system 89, 90, 91. This comprises a series of thumb screws 110, 111, 112 (Fig. 5) which are mounted in a rigid bracket 114 and which act upon the movable collar 94. With this arrangement motion of the collar and of the associated electrode elements may be produced in one plane by differential action of the thumb screws 110 and 112 while motion in the other plane may be produced by the thumb screw 111 acting against restraining springs 115.

As in the arrangement of Fig. 1 the conjoint action of the two manipulating mechanisms permits the effect of a very fine adjustment to be obtained by means of two relatively coarse mechanical systems, whose total cost may be very much less than the cost of a single manipulator of the required fineness.

While the invention has been described by reference to numerous embodiments thereof, it will be understood that numerous modifications may be made by those skilled in the art without departing from the invention. I, therefore, aim in the appended claims to cover all such variations as come within the true spirit and scope of the foregoing disclosure.

What I claim as new and desire to secure by Letters Patent of the United States is:

1. An electron microscope comprising a tubular evacuated chamber including a deformable lateral portion, a succession of electron lenses, image reproducing means following said lenses, means for supporting a specimen within said chamber in cooperative relation to the first of said lenses, means for producing a controlled motion of said specimen support in a direction transverse to the axis of said first lens thereby to bring a desired portion of the specimen into the effective object field of the lens, means supporting a later one of said lenses in said lateral portion, and means associated with said lateral portion for producing controlled transverse motion of said later lens.

2. An electron microscope comprising a tubular evacuated chamber including a deformable lateral portion, a plurality of electrostatic electron lenses supported within said chamber, image reproducing means following said lenses, means for supporting a specimen within said chamber in cooperative relation to the first of said lenses, means for producing controlled motion of said specimen support in a direction transverse to the axis of said lens thereby to bring a desired portion of the specimen into the effective object field of the lens, means supporting a later of said lenses in said lateral portion, and means external to and supported by said chamber adjacent said deformable portion for producing controlled transverse motion of said later lens, said last-named means being operable to bring a desired part of the image produced by said first lens into the effective object field of said later lens.

SIMON RAMO.

REFERENCES CITED

The following references are of record in the file of this patent:

UNITED STATES PATENTS

| Number | Name | Date |
|---|---|---|
| 2,200,095 | Marton | May 7, 1940 |
| 2,267,714 | Berries et al. | Dec. 30, 1941 |
| 2,267,769 | Von Ardenne | Dec. 30, 1941 |
| 2,270,112 | Berries et al. | Jan. 13, 1942 |
| 2,275,234 | Ruedy | Mar. 3, 1942 |
| 1,137,192 | Ferber | Apr. 27, 1915 |
| 1,130,468 | Bierbrauer et al. | Mar. 2, 1915 |
| 2,277,024 | Ruska et al. | Mar. 17, 1942 |
| 2,305,459 | Schuchmann et al. | Dec. 15, 1942 |
| 2,058,914 | Rudenberg | Oct. 27, 1936 |
| 2,363,359 | Ramo | Nov. 21, 1944 |

OTHER REFERENCES

Von Ardenne, "Uber en Universal-Elecktronenmikroskopp Physik," vol. 115, pp. 339–368, March 1940. (Copy in 250–49.5.)

Martin et al., "A New Electron Microscope," Journal of Scientific Instruments, vol. 14, 1937, pages 16 to 20.